Patented Dec. 11, 1945

2,390,597

UNITED STATES PATENT OFFICE 2,390,597

INSECTICIDES

George H. Law and John H. Purse, South Charleston, W. Va., assignors to Carbide and Carbon Chemicals Corporation, a corporation of New York No Drawing. Application December 5, 1942, Serial No. 467,999

13 Claims. (Cl. 167—30)

Our copending application Serial No. 308,950, filed December 13, 1939, of which the present application is a continuation-in-part, describes insecticides and insecticidal compositions based on the toxicity to insects of five aliphatic secondary amines, viz. di-n-hexyl amine, di-n-heptyl amine, cyclopentenyl n-hexyl amine, cyclopentenyl n-heptyl amine and di-2-ethylhexyl amine. As is apparent, the five amines named do not constitute a recognizable chemical class, nor do they fall within any regular chemical genus which does not also contain other substances of inadequate toxicity. Of these five amines, di-n-hexyl amine was advanced as the preferred and most toxic substance.

We have now determined by extensive investigation of the insecticidal qualities of a wide variety of amines that an unexpectedly high degree of toxicity to insects is possessed by a larger group of amines than was proposed in our earlier application, and that, contrary to what was previously supposed, this high degree of toxicity is definitely correlated with the chemical structure of the amines. Di-n-hexyl amine, di-n-heptyl amine and di-2-ethylhexyl amine are not included in this larger group of amines for the reason that improved testing procedures have not shown these substances to have the degree of toxicity which we assigned to them in our earlier application.

This invention accordingly is directed to insecticidal materials and insecticide compositions which contain as an essential ingredient one or more amines of the general type

in which at least one of the substituent radicals, R, is a cyclopentenyl group,

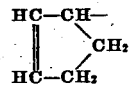

We have found by test that the presence of the cyclopentenyl radical confers on primary, secondary and tertiary amines a degree of toxicity to insects which makes such amines valuable as insecticides. The value and advantage of the invention in combatting insect pests are numerous and will be apparent.

The cyclopentenyl amines may be used as ingredients of aqueous or non-aqueous solutions, dispersions or emulsions for application as contact insecticides; they may be combined with solid substances for application as dusts or powders; or they may, where appropriate conditions prevail and where their volatility under those conditions will permit, be used in the vapor or gaseous state as fumigants. These amines may be combined with each other and with other substances, such as those known to be insecticidal or insect-activating in character. As examples of these there may be mentioned the active principles of derris and pyrethrum, sulfur and its compounds, rotenone and the like.

Cyclopentenyl amines can be made by reaction of cyclopentenyl chloride with ammonia and with primary and secondary amines by conventional methods used for the preparation of amines generally.

All of the cyclopentenyl amines are liquids possessing the usual odor of amines, and exhibiting the general characteristics common to amines. The physical properties of representative cyclopentenyl amines are given below, and, for comparison, the properties of di-n-hexyl amine, di-2-ethylhexyl amine and a cyclopentylamine are also given.

Table I

| | Amine | Boiling point, °C. at— Degrees | Absolute pressure, mm. Hg Mm. | Specific gravity, 27°/20° C. |
|---|---|---|---|---|
| 1 | N-cyclopentenyl | 108 | 760 | 0.890 |
| 2 | N-cyclopentenyl N-butyl | 60 | 8 | 0.854 |
| 3 | N-cyclopentenyl N-hexyl | 95 | 10 | 0.844 |
| 4 | N-cyclopentenyl N-heptyl | 98 | 5 | 0.845 |
| 5 | N-cyclopentenyl N-2-ethylhexyl | 87 | 3 | 0.850 |
| 6 | N-cyclopentenyl N-4-ethyl-1-methyloctyl | 99 | 1 | 0.850 |
| 7 | N-cyclopentenyl N-cyclohexyl | 105 | 14 | 0.920 |
| 8 | N-cyclopentenyl N-alpha-methylbenzyl | 130 | 1 | 0.990 |
| 9 | N-cyclopentenyl N-(2, 5- endomethylene-6-methyl-hexahydrobenzyl) | 123 | 4 | 0.948 |
| 10 | N-cyclopentenyl N-(3, 5, 6-trimethylhexahydrobenzyl) | 118 | 2.5 | 0.919 |
| 11 | N-cyclopentenyl N, N-dibutyl | 84 | 1.5 | 0.841 |
| 12 | N-cyclopentenyl N, N-di (2-ethyl hexyl) | 128 | 0.5 | 0.826 |
| 13 | N, N-dicyclopentenyl N-butyl | 97 | 3 | 0.910 |
| 14 | N, N-dicyclopentenyl N-2-ethylhexyl | 128 | 1 | 0.889 |
| | For comparison: | | | |
| 15 | N-cyclopentyl N-2-ethylhexyl | 102 | 4.5 | 0.837 |
| 16 | N, N-di-n-hexyl | 95 | 6 | 0.787 |
| 17 | N, N-di-2-ethylhexyl | 127 | 7 | 0.797 |

In order to determine the insecticidal potency of these amines by procedures that enable consistently reproducible and reliable results to be obtained, they were tested in comparison with a reference material corresponding in potency to the Official Test Insecticide of the National Association of Insecticide and Disinfectant Manufacturers.

The apparatus used for the tests consists of a spray gun mounted on top of a cylindrical spray tower which, in turn, rested on a base containing the insects to be treated. The tower was 36 inches tall with an inside diameter of 8 inches. The test insect used was the common fly (Musca domestica). In conducting each test, approximately 50 flies, four to five days old, were placed in the apparatus and treated with a spray of the material to be tested. After 24 hours, the number of flies dead and alive was determined. The potency of the material is expressed as the percentile value of the average number of flies killed in four tests.

Each substance to be tested was dissolved in a highly refined kerosene fraction at a concentration of either 1000 or 2000 milligrams per 100 milliliters of finished spray. The reference spray contained 100 milligrams of pyrethins per 100 milliliters of spray. Each treatment was replicated twice on each of two different days. Equal volumes of all the solutions tested were employed. Under these testing conditions, the reference spray produced a mortality of approximately 50% of the flies treated (average value 52% for tests on each of seven different days, a total of 14 tests).

The following is a tabulation of the results of tests on ten of the cyclopentenyl amines named in Table I:

Table II

| | Amine | Concentration, mgm./100 ml. | Percent kill |
|---|---|---|---|
| 1 | N-cyclopentenyl N-butyl | 2,000 | 95 |
| 2 | N-cyclopentenyl N-hexyl | 2,000 | 100 |
| 3 | N-cyclopentenyl N-2-ethylhexyl | 2,000 | 100 |
| 4 | N-cyclopentenyl N-4-ethyl-1-methyloctyl | 1,000 | 49 |
| 5 | N-cyclopentenyl N-cyclohexyl | 1,000 | 85 |
| 6 | N-cyclopentenyl N-alpha-methylbenzyl | 2,000 | 100 |
| 7 | N-cyclopentenyl N-(2,5-endomethylene-6-methylhexahydrobenzyl) | 2,000 | 100 |
| 8 | N-cyclopentenyl N-(3,5,6-trimethylhexahydrobenzyl) | 2,000 | 82 |
| 9 | N,N-dicyclopentenyl N-butyl | 2,000 | 88 |
| 10 | N,N-dicyclopentenyl N-2-ethylhexyl | 2,000 | 100 |
| | For comparison: | | |
| 11 | N-cyclopentyl N-2-ethylhexyl | 2,000 | 41 |
| 12 | N,N-di-n-hexyl | 2,000 | 50 |
| 13 | N,N-di-2-ethylhexyl | 2,000 | 18 |
| 14 | Reference spray (pyrethrins) | 100 | 52 |

It is evident from Table II that the introduction of the cyclopentenyl group into amines of all classes brings to these amines a remarkable insecticidal potency. Moreover, the potency of the amines of this invention is directly attributable to the presence of the unsaturated cyclopentenyl group. This is shown by the fact that N-cyclopentenyl N-2-ethylhexyl amine (No. 3) produced 100% mortality in these tests, whereas the analogous compound in which the saturated cyclopentyl group replaced the cyclopentenyl group, No. 11, produced a mortality of only 41%.

It will be observed that the testing method described above differs from the Peet-Grady method which is frequently used for evaluation of fly sprays and which is the officially approved method of the National Association of Insecticide and Disinfectant Manufacturers. However, the method by which the data of Table II were obtained is a commonly used modification of the Peet-Grady method, and has been shown to give reliable and reproducible results. It possesses the advantages of requiring less space and fewer insects. Some of the cyclopentenyl amines of this invention have been tested by the Peet-Grady method. For instance, a solution containing 1500 milligrams of N-cyclopentenyl N-cyclohexyl amine in 100 milliliters of the refined kerosene base and a like solution containing the same amount of N-cyclopentenyl N-2-ethylhexyl amine were so tested, and were rated as "A" sprays.

While fly spray tests as described are considered the most reliable and representative means of evaluating materials for insecticidal purposes, other tests under a variety of conditions employing several species of test insects have invariably shown that the cyclopentenyl amines as a class possess unusually great insecticidal potency. Numerous members of this class have been tested and found to be effective to kill mosquito larva (Culex pipiens and Culex quinquefasciatus) in water, as fumigants against confused flour beetles (Tribolium confusum), and rice weevils (Sitophilus oryzae), and as contact insecticides against aphids (Aphis rumicis).

The use of the cyclopentenyl amines of this invention obviously is not limited to the methods of preparation, application, or to the proportions in insecticides containing them as herein specifically described. Many modifications and adaptations of these substances in insecticide preparations and uses will be apparent, and such modifications are included within the invention as defined by the appended claims.

We claim:

1. Insecticide composition essentially containing N-cyclopentenyl N-cyclohexyl amine.

2. Insecticide composition essentially containing N-cyclopentenyl N-2-ethylhexyl amine.

3. Insecticide composition essentially containing N,N-dicyclopentenyl N-2-ethylhexyl amine.

4. Method of combatting insect pests which comprises subjecting them to N-cyclopentenyl N-cyclohexyl amine.

5. Method of combatting insect pests which comprises subjecting them to N-cyclopentenyl N-2-ethylhexyl amine.

6. Method of combatting insect pests which comprises subjecting them to N,N-dicyclopentenyl N-2-ethylhexyl amine.

7. Insecticide composition comprising: an amine of the group consisting of primary, secondary and tertiary amines having at least one cyclopentenyl group attached directly to the amino nitrogen atom; and a carrier for said amine.

8. Insecticide composition comprising an oil and an amine of the group consisting of primary, secondary and tertiary amines having at least one cyclopentenyl group attached directly to the amino nitrogen atom.

9. Insecticide composition comprising a kerosene fraction and an amine of the group consisting of primary, secondary and tertiary amines having at least one cyclopentenyl group attached directly to the amino nitrogen atom.

10. Method of combatting insect pests which comprises subjecting them to a composition comprising an amine of the group consisting of primary, secondary and tertiary amines having at least one cyclopentenyl group attached directly to the amino nitrogen atom.

11. Method of combatting insect pests which comprises subjecting them to a composition comprising: an amine of the group consisting of primary, secondary and tertiary amines having at least one cyclopentenyl group attached directly to the amino nitrogen atom; and a carrier for said amine.

12. Method of combatting insect pests which comprises subjecting them to a composition comprising an oil and an amine of the group consisting of primary, secondary and tertiary amines having at least one cyclopentenyl group attached directly to the amino nitrogen atom.

13. Method of combatting insect pests which comprises subjecting them to a composition comprising a kerosene fraction and an amine of the group consisting of primary, secondary and tertiary amines having at least one cyclopentenyl group attached directly to the amino nitrogen atom.

GEORGE H. LAW.
JOHN H. PURSE.